United States Patent
Lin et al.

(10) Patent No.: US 11,409,346 B2
(45) Date of Patent: Aug. 9, 2022

(54) CONTROL CIRCUIT AND METHOD FOR FAST SETTING POWER MODE

(71) Applicant: Nuvoton Technology Corporation, Hsinchu (TW)

(72) Inventors: Jen-Lieh Lin, Hsinchu County (TW); Chuang-Huang Kuo, Hsinchu (TW); Cheng-Chih Wang, Jhubei (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 196 days.

(21) Appl. No.: 16/719,041

(22) Filed: Dec. 18, 2019

(65) Prior Publication Data
US 2020/0192448 A1 Jun. 18, 2020

(30) Foreign Application Priority Data
Dec. 18, 2018 (TW) ................................. 107145673

(51) Int. Cl.
*G06F 1/26* (2006.01)
*H02J 9/00* (2006.01)

(52) U.S. Cl.
CPC ................ *G06F 1/26* (2013.01); *H02J 9/005* (2013.01)

(58) Field of Classification Search
None
See application file for complete search history.

(56) References Cited

U.S. PATENT DOCUMENTS

| | | | | |
|---|---|---|---|---|
| 5,652,894 A * | 7/1997 | Hu | ......................... | G06F 9/4418 713/322 |
| 5,996,083 A * | 11/1999 | Gupta | ................... | G06F 9/3836 713/322 |
| 6,510,525 B1 * | 1/2003 | Nookala | ............... | G06F 1/3265 713/324 |
| 6,625,740 B1 * | 9/2003 | Datar | .................... | G06F 9/3885 713/324 |
| 8,775,839 B2 | 7/2014 | Cousson et al. | | |

(Continued)

FOREIGN PATENT DOCUMENTS

| TW | 201317997 A | 5/2013 |
|---|---|---|
| TW | 01716926 A | 5/2017 |

(Continued)

*Primary Examiner* — Danny Chan
(74) *Attorney, Agent, or Firm* — Muncy, Geissler, Olds & Lowe, P.C.

(57) ABSTRACT

A control circuit is provided. A memory is configured to store a program code. A central processing unit (CPU) executes a plurality of instructions according to the program code. When a specific instruction is executed by the CPU, the CPU generates a control signal. A power mode management circuit generates a selection signal according to the control signal. A processing circuit transforms first power data according to the selection signal. A first storage circuit stores the first power data. The processing circuit generates first set data and second set data according to first power data. A first specific device operates in a first power mode according to the first set data. A second specific device operates in a second power mode according to the second set data. The first storage circuit, the power mode management circuit and the processing circuit are in an always-on state.

18 Claims, 4 Drawing Sheets

(56) References Cited

U.S. PATENT DOCUMENTS

| | | | |
|---|---|---|---|
| 9,671,845 B2 | 6/2017 | Conroy et al. | |
| 2003/0188207 A1* | 10/2003 | Schelling | G06F 1/24 713/310 |
| 2004/0187040 A1* | 9/2004 | Sasagawa | G06F 1/3243 713/300 |
| 2006/0179329 A1* | 8/2006 | Terechko | G06F 1/3203 713/300 |
| 2007/0180279 A1* | 8/2007 | Sullam | G06F 1/263 713/300 |
| 2009/0204837 A1* | 8/2009 | Raval | G06F 1/3203 713/330 |
| 2010/0218019 A1* | 8/2010 | Eckhard | G06F 1/3203 713/322 |
| 2011/0283130 A1* | 11/2011 | Pai | G06F 1/3287 713/330 |
| 2013/0073889 A1* | 3/2013 | Rauschmayer | G06F 1/3221 713/324 |
| 2014/0047247 A1* | 2/2014 | Rzehak | G06F 1/3243 713/300 |
| 2016/0092377 A1* | 3/2016 | Sauer | G06F 1/3243 711/163 |
| 2017/0115723 A1* | 4/2017 | Shurin | G06F 1/3268 |
| 2017/0344093 A1* | 11/2017 | Ting | G06F 1/28 |
| 2018/0217648 A1* | 8/2018 | Flynn | G06F 1/3287 |

FOREIGN PATENT DOCUMENTS

| | | | |
|---|---|---|---|
| TW | 201832449 A | 9/2018 | |
| TW | I634720 B | 9/2018 | |
| TW | I640147 B | 11/2018 | |

\* cited by examiner

| | SP5 | SP4 | SP3 | SP2 | SP1 | |
|---|---|---|---|---|---|---|
| PD0 | 0 | 0 | 1 | 0 | 1 | 1 | 0 | 0 | 0 | 1 |

| | SP5 | SP4 | SP3 | SP2 | SP1 | |
|---|---|---|---|---|---|---|
| PD1 | 0 | 0 | 1 | 0 | 0 | 1 | 1 | 0 | 1 | 1 |

| | SP5 | SP4 | SP3 | SP2 | SP1 | |
|---|---|---|---|---|---|---|
| PD2 | 0 | 0 | 1 | 1 | 0 | 1 | 0 | 0 | 1 | 1 |

FIG. 2

CONTROL CIRCUIT AND METHOD FOR FAST SETTING POWER MODE

CROSS REFERENCE TO RELATED APPLICATIONS

This Application claims priority of Taiwan Patent Application No. 107145673, filed on Dec. 18, 2018, the entirety of which is incorporated by reference herein.

BACKGROUND OF THE INVENTION

Field of the Invention

The invention relates to a control circuit, and more particularly to a control circuit that can quickly change the power mode of a specific device.

Description of the Related Art

With technological development, the types and functions of electronic devices have increased. Each electronic device generally has a battery to provide power to the internal elements of the electronic device. When the capacity of the battery is insufficient, the electronic device cannot operate normally.

BRIEF SUMMARY OF THE INVENTION

In accordance with an embodiment, a control circuit comprises a memory, a central processing unit (CPU), a power mode management circuit, a processing circuit and a second storage circuit. The memory is configured to store a program code. The CPU executes a plurality of instructions according to the program code. In response to a specific instruction being executed by the CPU, the CPU generates a first control signal. The power mode management circuit generates a selection signal according to the first control signal. The processing circuit transforms first power data or second power data according to the selection signal. The first storage circuit stores the first power data. The second storage circuit stores the second power data. In response to the processing circuit transforming the first power data, the processing circuit generates first set data and second set data, a first specific device operates in a first power mode according to the first set data, and a second specific device operates in a second power mode according to the second set data. The first storage circuit, the second storage circuit, the power mode management circuit and the processing circuit are in an always-on state.

A method for fast setting a power mode is provided. An exemplary embodiment of a method for fast setting a power mode is described in the following paragraph. A program code is executed. A determination is made as to whether a specific instruction occurs in the program code. First power data is transformed to generate first set data and second set data in response to the specific instruction occurring in the program code. The first set data is provided to a first specific device to direct the first specific device to enter a first power mode. The second set data is provided to a second specific device to direct the second specific device to enter a second power mode. The first power data is stored outside of the first specific device and the second specific device.

Methods fast setting power mode may be practiced by the control circuit which have hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The invention can be more fully understood by referring to the following detailed description and examples with references made to the accompanying drawings, wherein:

FIG. 2 is a schematic diagram of an exemplary embodiment of power data according to various aspects of the present disclosure.

DETAILED DESCRIPTION OF THE INVENTION

Figure 1:
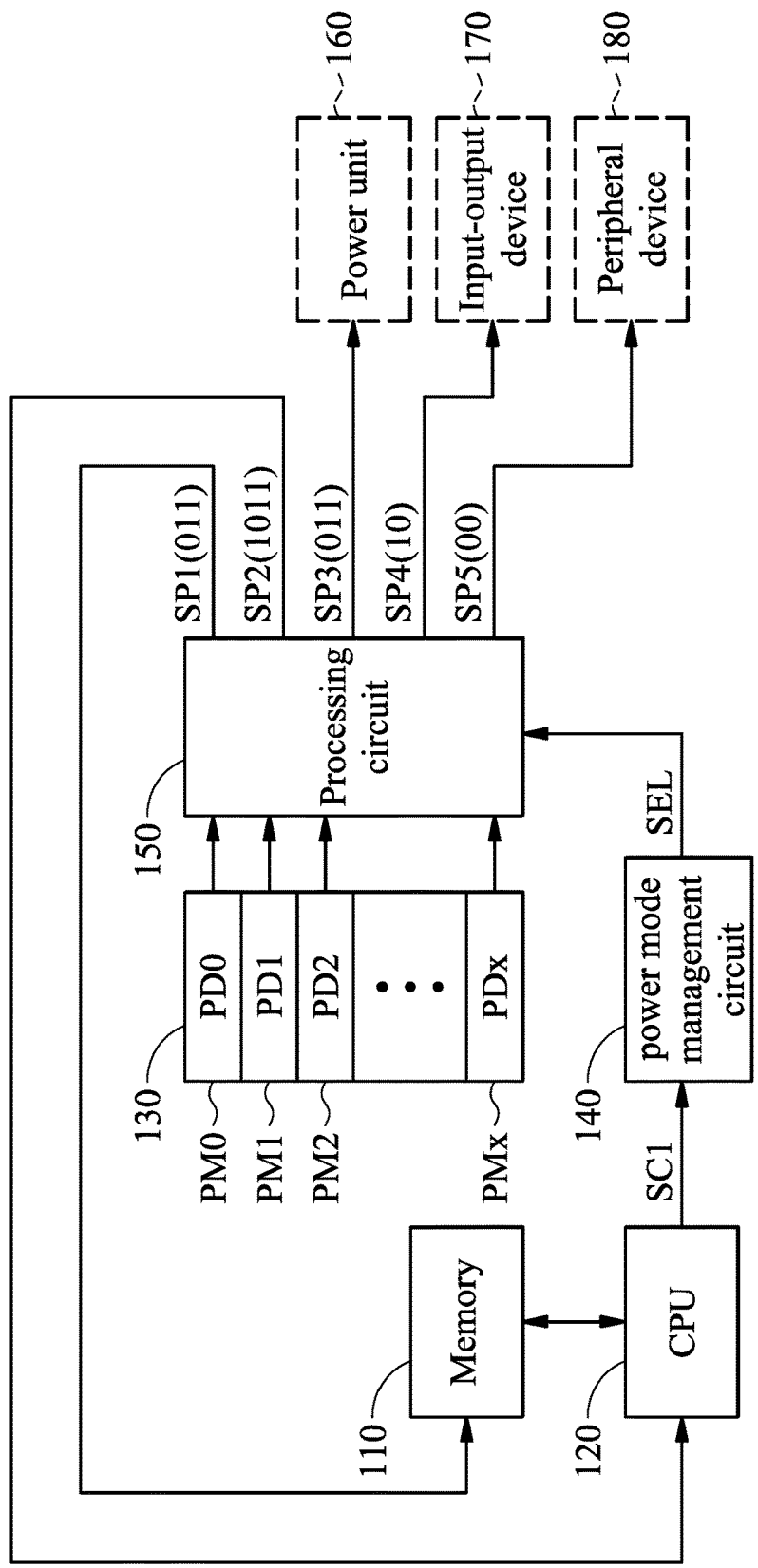
FIG. 1 is a schematic diagram of an exemplary embodiment of a control circuit according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of a control circuit according to various aspects of the present disclosure. The control circuit 100 comprises a memory 110, a central processing unit (CPU) 120, a power state table 130, a power mode management circuit 140 and a processing circuit 150. The memory 110 is configured to store a program code. The kind of memory 110 is not limited in the present disclosure. The memory 110 may be a volatile memory or a non-volatile memory.

The CPU 120 executes a plurality of instructions according to the program code stored in the memory 110. In this embodiment, when the CPU 120 executes a specific instruction, the CPU 120 generates a control signal SC1. In this embodiment, the specific instruction is related to the power mode of at least one specific device. In one embodiment, the control signal SC1 is an instruction to control the operation of the power mode management circuit 140.

The power state table 130 records power data PD0~PDx. Each power data has at least one set data. Each set data is utilized to set the power state of the corresponding specific device. In this embodiment, the power data PD0~PDx are stored in the storage circuits PM0~PMx respectively. In one embodiment, each of the storage circuits PM0~PMx is a register circuit. In this embodiment, each of the storage circuits PM0~PMx operates in an always-on state. In other words, the operation voltages of the storage circuits PM0~PMx are fixed. Therefore, the storage circuits PM0~PMx can immediately provide the power data PD0~PDx.

The power mode management circuit 140 generates a selection signal SEL according to the control signal SC1. The processing circuit 150 selects and processes one of the power data PD0~PDx according to the selection signal SEL to generate set data SP1~SP5. The processing circuit 150 provides the set data SP1~SP5 to the corresponding external devices to control the power states of the external devices. In other embodiments, the processing circuit 150 may generate more set data or fewer set data to control more external devices or fewer external devices.

In some embodiments, when two external devices receive the same set data, the two external devices may enter the same power mode or enter different power modes. Taking the set data SP1 and SP3 as an example, although the set data SP1 and SP3 have the same value (e.g., 011), the power mode of the memory 110 may be different from the power mode of the power unit 160. For example, the memory 110 operates in a sleep mode, and the power unit 160 operates in a low-speed mode. In other embodiments, when the set data SP1 and SP3 have the same value, the power mode of the memory 110 may be the same as the power mode of the power unit 160.

In some embodiments, when two external devices receive different set datum, the two external devices may enter the same power mode or different power modes. Taking the set data SP1 and SP2 as an example, although the value (e.g., 011) of the set data SP1 is different than the value (e.g., 1011) of the set data SP2, the power mode of the memory 110 may be the same as the power mode of the CPU 120, such as a low-speed mode. In other embodiments, when the value of the set data SP1 is different than the value of the set data SP2, the power mode of the memory 110 may be different from the power mode of the CPU 120.

The formats of set data SP1~SP5 are not limited in the present disclosure. In one embodiment, the number of bits of a least one of the pieces of set data SP1~SP5 may be the same as or different than the number of bits of another of the pieces of the set data SP1~SP5. In this embodiment, the set data SP1 has three bits, the set data SP2 has four bits, the set data SP3 has three bits, the set data SP4 has two bits, and the set data SP5 has two bits, but the disclosure is not limited thereto. In other embodiments, one of the pieces of set data SP1~SP5 may have more bits or fewer bits.

Additionally, since the set data SP1 has three bits, there are 8 ($2^3$) different possible values for the set data SP1. In this case, the memory 110 operates in a corresponding power mode according to the value of the set data SP1. Similarly, since the set data SP2 has four bits, there are 16 ($2^4$) different possible values for the set data SP2. Therefore, the CPU 120 can operate in 16 different power modes.

In this embodiment, the power state table 130, the power mode management circuit 140 and the processing circuit 150 are always turned on. In other words, the operation voltages of the power state table 130, the power mode management circuit 140 and the processing circuit 150 are maintained. In one embodiment, the operation voltage of at least one of the power state table 130, the power mode management circuit 140 and the processing circuit 150 is the same as or different than the operation voltage of another of the power state table 130, the power mode management circuit 140 and the processing circuit 150. Since the power state table 130, the power mode management circuit 140 and the processing circuit 150 operate in an always-on state, the power mode management circuit 140 can immediately activate the processing circuit 150 according to the control signal SC1 so that the processing circuit 150 generates the corresponding set data immediately.

The present disclosure does not limit which external devices the set data SP1~SP5 is provided to. Any device can receive the set data SP1~SP5 generated by the processing circuit 150, as long as the device needs power parameters. In this embodiment, the storage circuits PM0~PMx are independent of the external devices receiving the set data. Therefore, when the external devices enter a power down mode according to the set data, the operation voltages of the storage circuits PM0~PMx can be maintained so that the storage circuits PM0~PMx operate in a normal mode.

In this embodiment, the processing circuit 150 outputs the set data SP1 to the memory 110. The memory 110 enters a first power mode according to the value 011 of the set data SP1. The first power mode may be a normal mode or a power-down mode. The power-down mode may be a sleep mode, a standby mode or a shut-down mode. When the memory 110 operates in different power modes, the memory 110 uses different operation voltages. For example, when the memory 110 operates in a normal mode, the operation voltage of the memory 110 is equal to a first voltage. When the memory 110 operates in a sleep mode, the operation voltage of the memory 110 is equal to a second voltage. The second voltage is less than the first voltage.

In another embodiment, the processing circuit 150 outputs the set data SP2 to the CPU 120. The CPU 120 enters a second power mode according to the value 1011 of the set data SP2. In one embodiment, the second power mode may be a normal mode, a sleep mode, a standby mode or a shut-down mode. When the CPU 120 operates in different power modes, the CPU 120 causes different levels of power consumption.

In other embodiments, the processing circuit 150 further outputs the set data SP3~SP5. The power unit 160 enters a third power mode according to the value 011 of the set data SP3. The input-output device 170 enters a fourth power mode according to the value 10 of the set data SP4. The peripheral device 180 enters a fifth power mode according to the value 00 of the set data SP5. At least one of the third power mode, the fourth power mode and the fifth power mode may be a normal mode, a sleep mode, a standby mode or a shut-down mode.

In some embodiments, the storage circuits PM0~PMx are disposed outside of the memory 110, the CPU 120, the power unit 160, the input-output device 170 and the peripheral device 180. Furthermore, the operation voltage of each of the storage circuits PM0~PMx does not change with changes to the operation voltage of each of the memory 110, the CPU 120, the power unit 160, the input-output device 170 and the peripheral device 180. For example, when the memory 110 operates in a power-down mode, the operation voltage of the memory 110 is reduced. At this time, the operation voltages of the storage circuits PM0~PMx are not changed, even if the memory 110 operates in the power-down mode.

In this embodiment, since the storage circuits PM0~PMx, the power mode management circuit 150 and the processing circuit 150 are always turned on, appropriate power parameters are immediately provided to the external devices. The external devices are capable of changing power mode quickly, such as from a normal mode to a sleep mode. Therefore, the power consumption of the external devices can be reduced.

FIG. 2 is a schematic diagram of an exemplary embodiment of power data according to various aspects of the present disclosure. For clarity, only three pieces of power data PD0~PD2 are shown in FIG. 2. In this embodiment, the numbers of bits of the pieces of power data PD0~PD2 are the same, but the disclosure is not limited thereto. In other embodiments, the number of bits of at least one of the pieces of power data PD0~PD2 may be different than the number of bits of another of the pieces of power datum PD0~PD2.

The processing circuit 150 generates the pieces of set data SP1~SP5 according to the corresponding power data. The numbers of bits of the pieces of set data SP1~SP5 are not limited in the present disclosure. In one embodiment, the number of bits of one (e.g., SP1) of the pieces of set data SP1~SP5 is the same as the number of bits of another (e.g., SP3) of the pieces of set data SP1~SP5. In one embodiment, the number of bits of one (e.g., SP1) of the pieces of set data SP1~SP5 is different than the number of bits of another (e.g., SP2) of the pieces of set data SP1~SP5.

Additionally, when the value of first set data is the same as the value of second set data, the external devices corresponding to the first and second set data may enter the same or different power modes. Taking the power data PD1 as an example, the value (011) of the set data SP1 is the same as the value (011) of the set data SP3. In this case, when the processing circuit 150 provides the set data SP1 and SP3 to a first external device and a second external device respectively, the first and second external devices may enter the same power mode, such as a sleep mode. The first and second external devices may enter different power mode. For example, the first external device enters a low-speed mode and the second external device enters a sleep mode.

Furthermore, when the value of first set data is different from the value of second set data, the external devices corresponding to the first and second set data may enter the same or different power modes. Taking the power data PD0 as an example, the value (001) of the set data SP1 is different from the value (1100) of the set data SP2. In this case, when the processing circuit 150 provides the set data SP1 of the power data PD0 to a first external device and provides the set data SP2 of the power data PD0 to a second external device, the first and second external devices may enter the same power mode, but the disclosure is not limited thereto. In other embodiments, when the value of the set data SP1 is different from the value of the set data SP2, the first and second external devices may enter different power modes.

Figure 3:
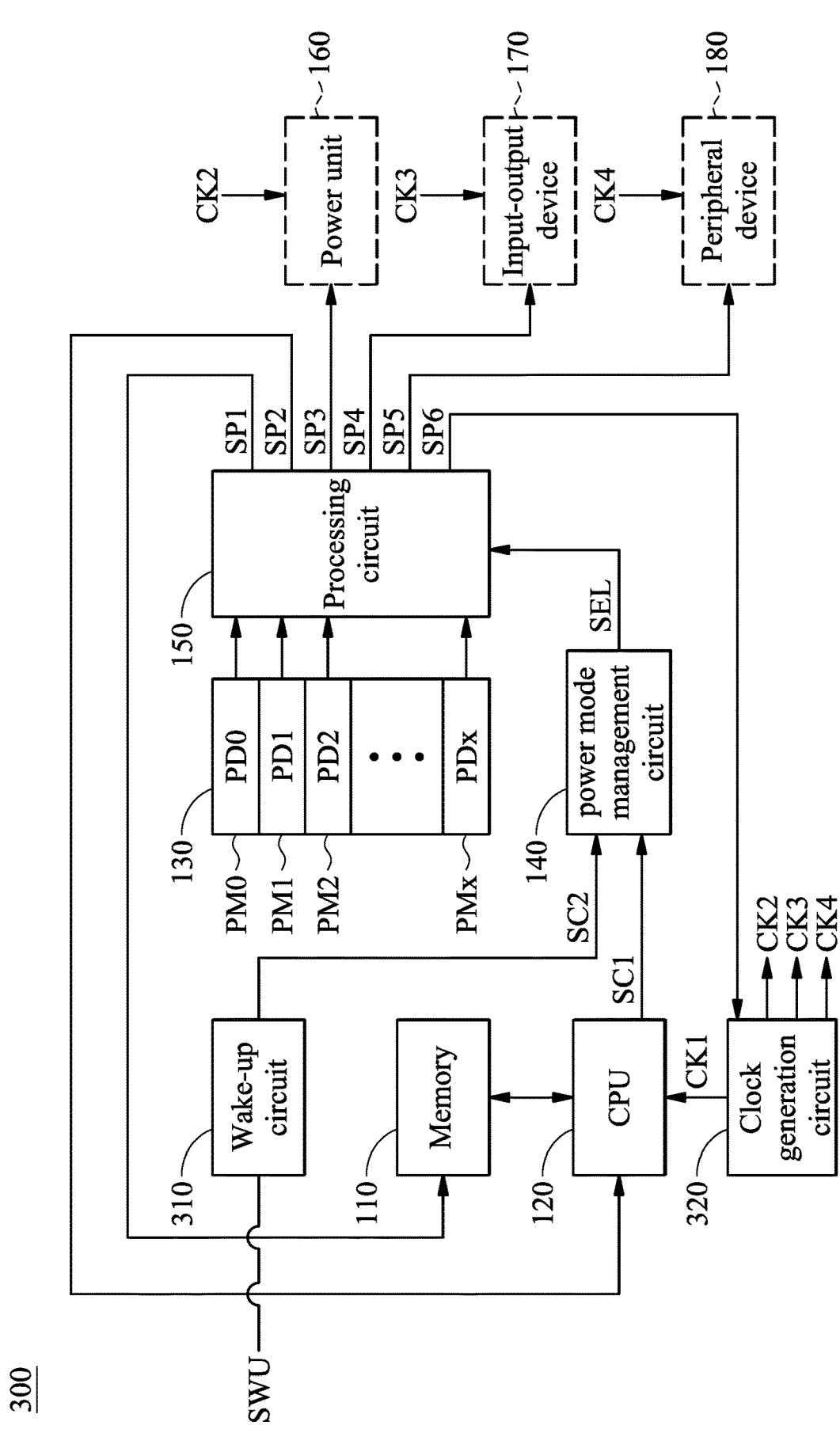
FIG. 3 is a schematic diagram of another exemplary embodiment of the control circuit according to various aspects of the present disclosure.

FIG. 3 is a schematic diagram of another exemplary embodiment of the control circuit according to various aspects of the present disclosure. FIG. 3 is similar to FIG. 1 exception that the control circuit 300 in FIG. 3 further comprises a wake-up circuit 310. The wake-up circuit 310 generates a control signal SC2 according to a wake-up signal SWU to the power mode management circuit 140.

In this embodiment, when the CPU 120 enters a sleep mode according to the set data SP2, the CPU 120 stops generating the control signal SC1 to the power mode management circuit 140. In such case, when the wake-up signal SWU is enabled, the wake-up circuit 310 generates a control signal SC2. The power mode management circuit 140 adjusts the selection signal SEL according to the control signal SC2. The processing circuit 150 selects and processes the power data of a storage circuit according to the selection signal SEL to generate set data to the device to be waked-up, such as the CPU 120.

Since the storage circuits PM0~PMx, the power mode management circuit 140 and the processing circuit 150 are always turned on, they can immediately provide the appropriate power parameters to a specific device so that the specific device immediately enters a normal mode.

In one embodiment, when the CPU 120 enters a power-down mode, for example, a sleep mode, a standby mode or a shut-down mode, a counter (not shown) starts adjusting a count value. When the count value of the counter reaches a target value, the counter enables the wake-up signal SWU. Therefore, the wake-up circuit 310 generates the control signal SC2 to the power mode management circuit 140.

In another embodiment, the wake-up signal SWU is enabled by an external device, such as a mouse. When the external device operates, the wake-up circuit 310 generates the control signal SC2. The power mode management circuit 140 adjusts the selection signal SEL according to the control signal SC2 to select the appropriate power data.

In other embodiments, before some external devices change its power mode, the external devices enter a specific power mode and then the external device can enter another power mode. In this case, when the power mode management circuit 140 receives the control signal SC1 or SC2, the power mode management circuit 140 first reads a predetermined value stored in a memory disposed in the power mode management circuit 140 to determine the feature of the external device. For example, the power mode management circuit 140 determines whether the external device is required to enter a specific power mode according to the predetermined value. When the external device is required to enter a specific power mode, the power mode management circuit 140 directs the processing circuit 150 to process power data so that the external device first enters the specific power mode (e.g., a normal mode). Then, the power mode management circuit 140 directs the processing circuit 150 to process another power data so that the external device exits the specific power mode and enters another power mode (e.g., a sleep mode).

In other embodiments, the control circuit 300 further comprises a clock generation circuit 320. The clock generation circuit 320 generates an operation clock CK1 to the CPU 120. The CPU 120 executes the program code stored in the memory 110 according to the operation clock CK1. In this case, the processing circuit 150 provides set data SP6 to change the power mode of the clock generation circuit 320. In some embodiments, the clock generation circuit 320 further provides operation clocks CK2~CK4 to the power unit 160, the input-output device 170 and the peripheral device 180. In one embodiment, the CPU 120 sends a control signal (not shown) to control the frequencies of the operation clocks CK1~CK4 generated by the clock generation circuit 320. In other embodiments, the processing circuit 150 utilizes the set data SP6 to control the frequencies of the operation clocks CK1~CK4 generated by the clock generation circuit 320.

Figure 4:
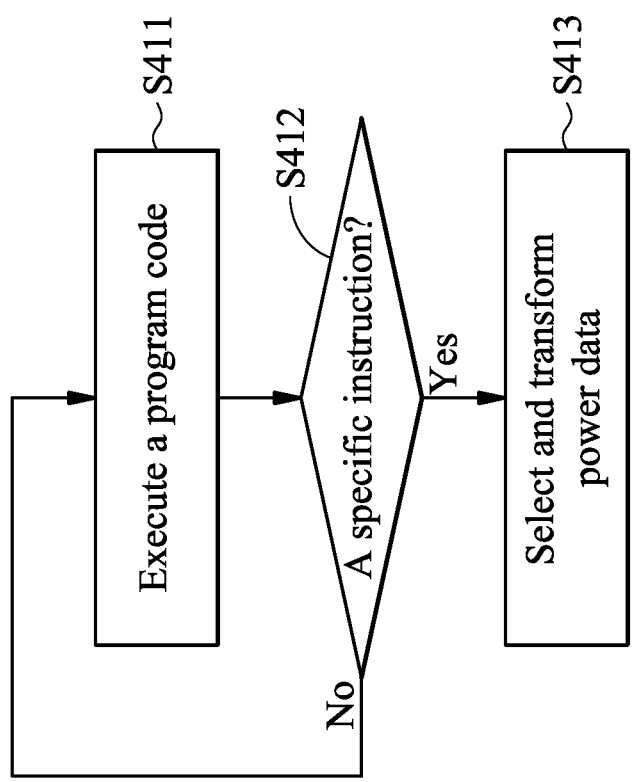
FIG. 4 is a flowchart of an exemplary embodiment of a method for fast setting a power mode according to various aspects of the present disclosure.

FIG. 4 is a flowchart of an exemplary embodiment of a method for fast setting a power mode according to various aspects of the present disclosure. First, a program code is executed (step S411). In one embodiment, the program code is stored in a memory. In this case, a CPU executes a plurality of instructions according to the program code.

A determination is made as to whether the instruction being executed by the CPU is a specific instruction (step S412). In one embodiment, the specific instruction is a switching instruction to change the power mode of at least one specific device. When the instruction being executed by the CPU does not the specific instruction, step S411 is performed to execute other instructions.

When the instruction being executed by the CPU is the specific instruction, power data is selected and transformed to provide a plurality of set data to many specific device (step S413). Taking FIG. 1 as an example, when the CPU 120 executes a specific instruction, the CPU 120 utilizes the power mode management circuit 140 to control the processing circuit 150 so that the processing circuit 150 selects and transforms specific power data. In one embodiment, when the CPU 120 executes different specific instructions, the processing circuit 150 selects and transforms different power data. In this embodiment, all power data are stored in the same storage circuit. In this case, the storage circuit comprises a plurality of registers to store different power data.

Each power data has a plurality of set data. Each set data is to set the power mode of a specific device. Taking FIG. 2 as an example, each of the power data PD0~PD2 ha set data SP1~SP5 to set the power modes of five external devices. In such cases, each external device enters the corresponding power mode according to the corresponding set data.

In this case, the storage circuit storing the power data is always turned-on. For example, when a specific device exits a normal mode and enters a sleep mode, the operation voltage provided to the specific device may be reduced. In this case, even if the specific device operates in the normal mode or the sleep mode, the operation voltage provided to the storage circuit is fixed at a normal value. Therefore, when the CPU executes the specific instruction, the storage circuit is capable of providing the corresponding power data to the processing circuit 150 immediately so that the processing circuit 150 fast changes the power mode of the external device.

In other embodiments, when the CPU enters a sleep mode and a trigger event occurs, step S413 selects and transforms the corresponding power data. In one embodiment, the trigger event is that the duration of the CPU being at the sleep mode reaches a predetermined time. In this case, when the CPU enters the sleep mode, a counter starts counting. When the count value of the counter reaches a target value, step S413 selects and transforms specific power data to change the power mode of at least one specific device. In another embodiment, a peripheral device (e.g., a mouse) causes the trigger event. Therefore, when the peripheral device operates, step S413 selects and transforms specific power data to change the power mode of at least one specific device.

In some embodiments, for some specific devices, before entering a power mode (e.g., a sleep mode), the specific devices need to be changed to a specific power mode (e.g., a normal mode). In this case, when a trigger event occurs or a specific instruction is executed, step S413 first selects and transforms first power data to direct a specific device to operate in a first power mode. Then, step S413 selects and transforms second power data to direct the specific device exits the first power mode and enters a second power mode.

Since the storage circuit storing the power data is always turned-on, the specific device is capable of changing the power mode quickly, such as to enter a normal mode or a power-down mode. For example, when a wake-up action occurs, the specific device can enter a normal mode quick and then the specific device normal operates. Additionally, when the specific device enters the power-down mode (e.g., a sleep mode, a standby mode or a shut-down mode), the power consumption of the system can be reduced. Furthermore, since the power data of all device are stored in the same storage circuits, the set time of the system is reduced.

Methods for fast setting power mode, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A control circuit comprising:
   a memory configured to store a program code;
   a central processing unit (CPU) executing a plurality of instructions according to the program code, wherein in response to a specific instruction being executed by the CPU, the CPU generates a first control signal;
   a power mode management circuit generating a selection signal according to the first control signal;
   a processing circuit transforming first power data or second power data according to the selection signal;
   a first storage circuit storing the first power data; and
   a second storage circuit storing the second power data, wherein:
   in response to the processing circuit transforming the first power data,
the processing circuit generates first set data and second set data,
   a first specific device operates in a first power mode according to the first set data, and a second specific device operates in a second power mode according to the second set data,
   the first storage circuit, the second storage circuit, the power mode management circuit and the processing circuit are in an always-on state.

2. The control circuit as claimed in claim 1, wherein the first specific device is the memory.

3. The control circuit as claimed in claim 2, wherein the second specific device is the CPU.

4. The control circuit as claimed in claim 1, wherein in response to the processing circuit transforming the second power data, the processing circuit generates third set data and fourth set data, the first specific device operates in a third power mode according to the third set data, and the second specific device operates in a fourth power mode according to the fourth set data.

5. The control circuit as claimed in claim 4, wherein the processing circuit comprises:

a first selector coupled between the first storage circuit and the first specific device to output the first set data to the first specific device;

a second selector coupled between the first storage circuit and the second specific device to output the second set data to the second specific device;

a third selector coupled between the second storage circuit and the first specific device to output the third set data to the first specific device; and a fourth selector coupled between the second storage circuit and the second specific device to output the fourth set data to the second specific device.

6. The control circuit as claimed in claim 1, further comprising:

a wake-up circuit generating a second control signal in response to the CPU entering a sleep mode and a wake-up signal being enabled, wherein the power mode management circuit adjusts the selection signal according to the second control signal.

7. The control circuit as claimed in claim 6, further comprising:

a counter adjusting a count value in response to the CPU entering the sleep mode, wherein in response to the count value being equal to a target value, the counter enables the wake-up signal.

8. The control circuit as claimed in claim 1, wherein the first set data is the same as the second set data, and the first power mode is different from the second power mode.

9. The control circuit as claimed in claim 1, wherein a number of bits of the first set data is different than a number of bits of the second set data.

10. The control circuit as claimed in claim 1, wherein the first storage circuit and the second storage circuit are independent of the first specific device and the second specific device.

11. A method for fast setting a power mode, comprising:

executing a program code;

determining whether a specific instruction occurs in the program code;

transforming first power data to generate first set data and second set data in response to the specific instruction occurring in the program code;

providing the first set data to a first specific device to direct the first specific device to enter a first power mode;

providing the second set data to a second specific device to direct the second specific device to enter a second power mode; and in response to a central processing unit (CPU) entering a sleep mode and a trigger event occurring:

transforming second power data to generate third set data;

providing the third set data to the CPU to direct the CPU to exit the sleep mode, wherein the first power data is stored outside of the first specific device and the second specific device.

12. The method as claimed in claim 11, further comprising:

storing the program code in a memory, wherein the memory is the first specific device.

13. The method as claimed in claim 12, further comprising:

utilizing the CPU to execute the program code, wherein the CPU is the second specific device.

14. The method as claimed in claim 11, further comprising:

adjusting a count value in response to the CPU entering the sleep mode, wherein the trigger event is that the count value reaches a target value.

15. The method as claimed in claim 11, wherein the first set data is the same as the second set data, and the first power mode is different from the second power mode.

16. The method as claimed in claim 11, wherein the number of bits of the first set data is different than the number of bits of the second set data.

17. The method as claimed in claim 11, wherein before entering the first power mode, the first specific device enters a predetermined power mode, wherein in response to the first specific device operating in the predetermined power mode, the power consumption of the first specific device is equal to a first value, in response to the first specific device operating in the first power mode, the power consumption of the first specific device is equal to a second value, and the first value is higher than the second value.

18. The method as claimed in claim 11, further comprising:

storing the first power data in a storage circuit; and maintaining an operation voltage of the storage circuit, wherein the operation voltage of the storage circuit is higher than an operation voltage of the first specific device operating in the first power mode.

* * * * *